US012521959B2

(12) United States Patent
Evans et al.

(10) Patent No.: US 12,521,959 B2
(45) Date of Patent: Jan. 13, 2026

(54) JIG FOR PLACEMENT OF GREETING CARD INSERTS

(71) Applicant: HALLMARK CARDS, INCORPORATED, Kansas City, MO (US)

(72) Inventors: Dennis Evans, Kansas City, MO (US); Edward Butenas, Kansas City, MO (US); Gerald Little, Kansas City, MO (US)

(73) Assignee: Hallmark Cards, Incorporated, Kansas City, MO (US)

( * ) Notice: Subject to any disclaimer, the term of this patent is extended or adjusted under 35 U.S.C. 154(b) by 188 days.

(21) Appl. No.: 18/372,962

(22) Filed: Sep. 26, 2023

(65) Prior Publication Data

US 2024/0100801 A1 Mar. 28, 2024

Related U.S. Application Data

(60) Provisional application No. 63/410,499, filed on Sep. 27, 2022.

(51) Int. Cl.
*B31D 1/00* (2017.01)
*B42D 15/04* (2006.01)

(52) U.S. Cl.
CPC .......... *B31D 1/0081* (2013.01); *B42D 15/042* (2013.01)

(58) Field of Classification Search
CPC ............................ B42D 15/042; B31D 1/0081
See application file for complete search history.

(56) References Cited

U.S. PATENT DOCUMENTS 6,909,526 B1 * 6/2005 Dawe ................ H04N 1/00795 355/75

* cited by examiner

*Primary Examiner* — Daniel McNally
(74) *Attorney, Agent, or Firm* — Stinson LLP

(57) ABSTRACT

A jig for placement of an insert sheet on a greeting card is disclosed. The jig comprises a support surface configured to support the greeting card. The jig further comprises a guide configured for movement between an open position and a closed position, wherein the guide enables placement of the greeting card at a predetermined location on the support surface when the guide is in the open position, and wherein the guide provides a template for placement of the insert sheet at a designated location on the greeting card when the guide is in the closed position.

25 Claims, 7 Drawing Sheets

JIG FOR PLACEMENT OF GREETING CARD INSERTS

CROSS-REFERENCE TO RELATED APPLICATION

This application claims the benefit of U.S. Provisional Patent Application Ser. No. 63/410,499, filed Sep. 27, 2022, which is incorporated herein by reference in its entirety.

BACKGROUND OF THE INVENTION

Various online ordering systems enable a consumer to order a product for delivery to a designated recipient. Some of these systems enable the consumer to indicate that the ordered product is a gift, in which case the consumer may enter a personalized message for the designated recipient. This personalized message is typically printed on a receipt or packing slip that is enclosed in the box or other packaging used to deliver the product to the designated recipient. This receipt or packing slip does not have a pleasing or stylish appearance, and thus, is not ideal for presenting the personalized message to the recipient. In addition, some recipients disregard or simply do not notice the receipt or packing slip enclosed in the box and, thus, do not even read the personalized message printed on the receipt or packing slip.

BRIEF SUMMARY OF THE INVENTION

The present invention is directed to a jig that may be used to place an insert sheet bearing a personalized message or other customized content on a greeting card. In some embodiments, the jig comprises a support surface and a guide that is configured for movement between an open position and a closed position. When in the open position, the guide enables placement of the greeting card at a predetermined location on the support surface—e.g., by registering the greeting card against a plurality of register pins. When in the closed position, the guide may serve as an indicator for application of an adhesive to the greeting card and also provides a template for placement of the insert sheet at a designated location on the greeting card. In an exemplary embodiment, the guide comprises a first guide segment disposed generally perpendicular to a second guide segment, wherein the insert sheet is placed at the designated location on the greeting card by aligning the top edge of the insert sheet with the bottom edge of the first guide segment and aligning the right edge of the insert sheet with the left edge of the second guide segment. Other embodiments of the jig are also disclosed herein.

The jig of the present invention enables the production of a greeting card with an attached insert sheet that overcomes many of the drawbacks of existing receipts and packing slips, including: (1) the personalized message is presented to the gift recipient on a greeting card having a pleasing and stylish appearance; and (2) the greeting card is more likely to be noticed and read by the gift recipient compared to a receipt or packing slip. Further, the process of creating the greeting card with the attached insert sheet can be easily incorporated into an existing packing station at a fulfillment center.

Various embodiments of the present invention are described in detail below, or will be apparent to one skilled in the art based on the disclosure provided herein, or may be learned from the practice of the invention. It should be understood that the above brief summary of the invention is not intended to identify key features or essential components of the embodiments of the present invention, nor is it intended to be used as an aid in determining the scope of the claimed subject matter as set forth below.

BRIEF DESCRIPTION OF THE DRAWINGS

A detailed description of various exemplary embodiments of the present invention is provided below with reference to the following drawings, in which.

Figure 1:
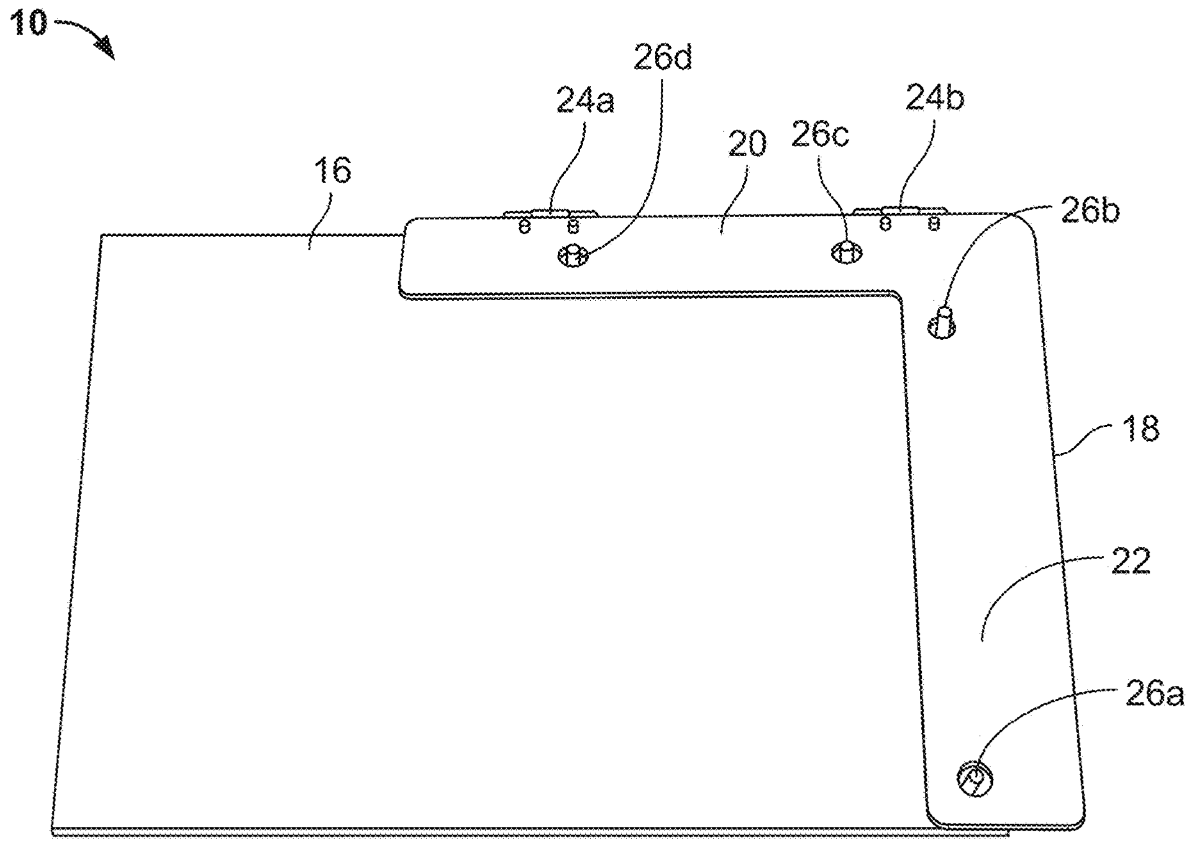
FIG. 1 is a perspective view of a jig that may be used to place an insert sheet on a greeting card in accordance with one embodiment of the invention.
Figure 3:
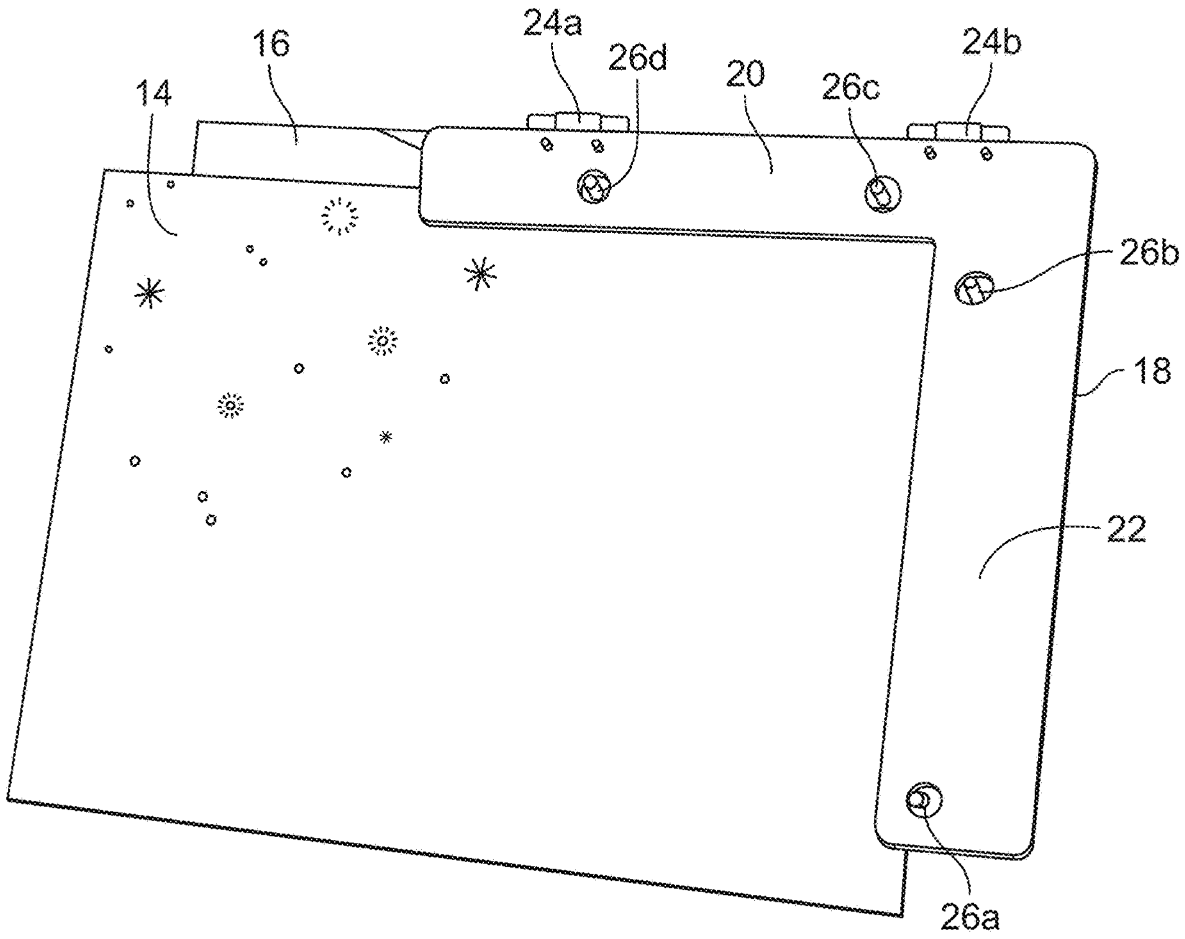
Figure 4:
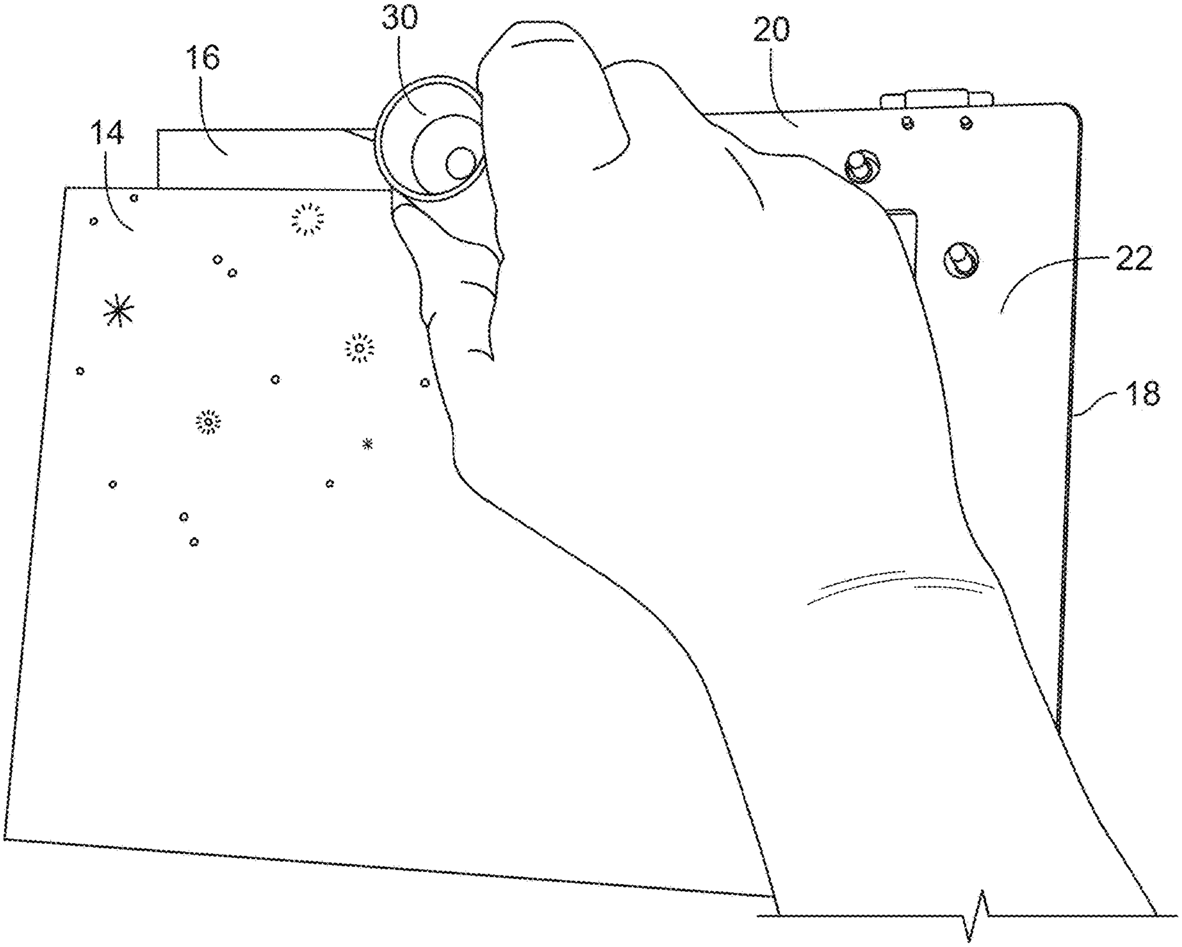
Figure 5:
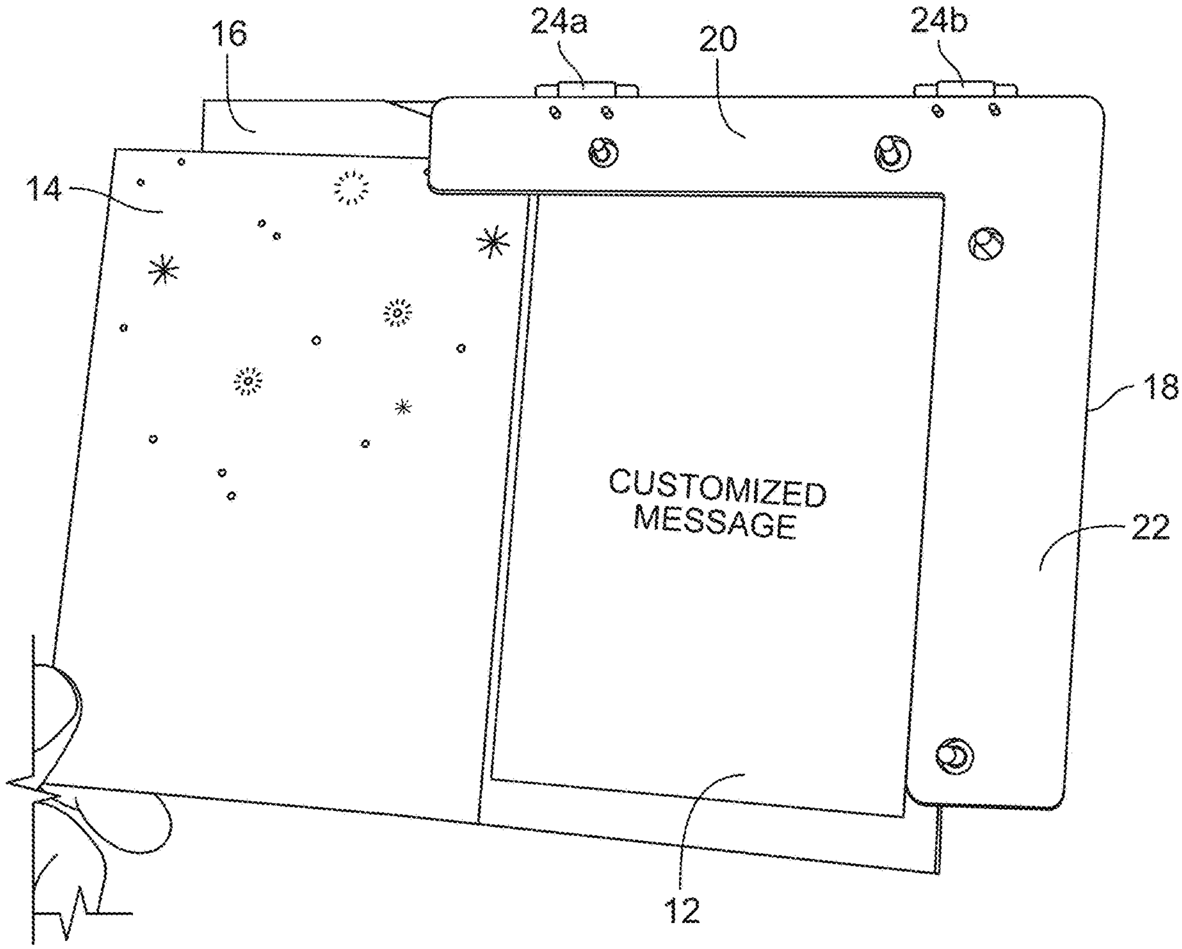
Figure 6:
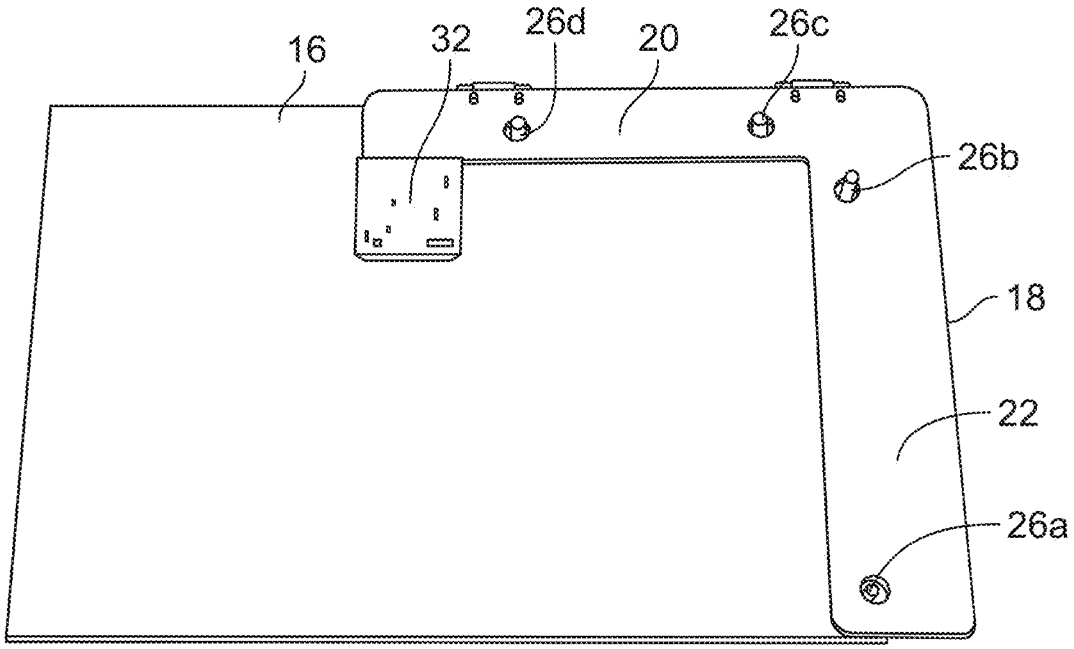
Figure 7:
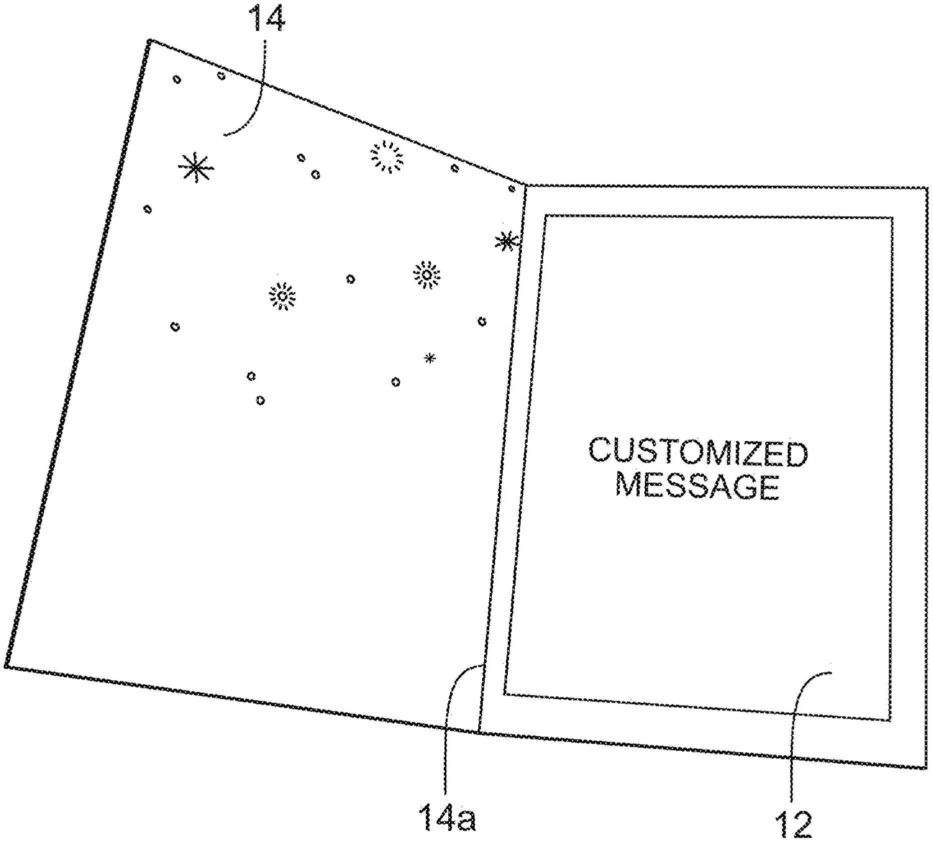

position;

FIG. 3 is a perspective view of the jig of FIG. 1, showing the guide in a closed position;

FIG. 4 is a perspective view of the jig of FIG. 1, showing the application of an adhesive to the greeting card;

FIG. 5 is a perspective view of the jig of FIG. 1, showing the insert sheet secured to the greeting card;

FIG. 6 is a perspective view of a jig that may be used to place an insert sheet on a greeting card in accordance with an alternative embodiment of the invention; and FIG. 7 is a perspective view of an exemplary greeting card with an insert sheet secured thereto.

DETAILED DESCRIPTION OF EXEMPLARY EMBODIMENTS

The present invention is directed to a jig for placement of an insert sheet on a greeting card. While the invention will be described in detail below with reference to various exemplary embodiments, it should be understood that the invention is not limited to the specific system configurations or methods of these embodiments. In addition, although the exemplary embodiments are described as embodying several different inventive features, one skilled in the art will appreciate that any one of these features could be implemented without the others in accordance with the invention.

In the present disclosure, references to "one embodiment," "an embodiment," "an exemplary embodiment," or "embodiments" mean that the feature or features being described are included in at least one embodiment of the invention. Separate references to "one embodiment," "an embodiment," "an exemplary embodiment," or "embodiments" in this disclosure do not necessarily refer to the same embodiment and are also not mutually exclusive unless so stated and/or except as will be readily apparent to one skilled in the art from the description. For example, a feature, structure, function, etc. described in one embodiment may also be included in other embodiments, but is not necessarily included. Thus, the present invention can include a variety of combinations and/or integrations of the embodiments described herein.

Referring to FIG. 1, a jig that may be used to place an insert sheet on a greeting card in accordance with one embodiment of the present invention is shown generally as reference number 10. In this embodiment, jig 10 is universal so as to accommodate different types of greeting cards (e.g., folded greeting cards, flat postcard-type greeting cards, etc.), as well as greeting cards having different lengths, widths, and thicknesses. Also, the greeting cards may be pre-decorated greeting cards having different design elements, such as text, images, graphics, design elements or other decorative features pre-printed on and/or secured to at least one card panel.

In the example shown in FIG. 1, jig 10 enables placement of an insert sheet 12 bearing a personalized message or other customized content on a pre-decorated, folded greeting card 14, as shown in FIG. 7. Greeting card 14 is made of cardstock that has been folded along a fold line 14*a* to form four panels—a front panel, a left inside panel, a right inside panel, and a back panel. In this embodiment, insert sheet 12 is made of a lighter stock paper than the cardstock of greeting card 14 and, as described below, is glued or otherwise secured to the right inside panel of greeting card 14. Of course, in other embodiments, insert sheet 12 may be made of the same or heavier stock paper than the cardstock of greeting card 14.

As shown in FIG. 1, jig 10 includes a generally planar support surface 16 that is configured to support greeting card 14. Jig 10 also includes a guide 18 comprised of a first guide segment 20 disposed generally perpendicular to a second guide segment 22. As can be seen, first guide segment 20 extends laterally along the top edge of support surface 16, and second guide segment 22 extends longitudinally along the right edge of support surface 16. In this embodiment, support surface 16 is made of wood and guide 18 is made of a metal plate, although other materials may be used in accordance with the present invention.

In this embodiment, two hinges 24*a* and 24*b* (best shown in FIGS. 3 and 5) are provided to pivotally mount first guide segment 20 to support surface 16. Thus, guide 18 is configured for movement between an open position in which guide 18 is pivoted upward with respect to support surface 16 and a closed position in which guide 18 is pivoted downward with respect to support surface 16. Of course, one skilled in the art will understand that other types of attachment mechanisms may be used to attach first guide segment 20 to support surface 16 in accordance with the present invention.

Figure 2:
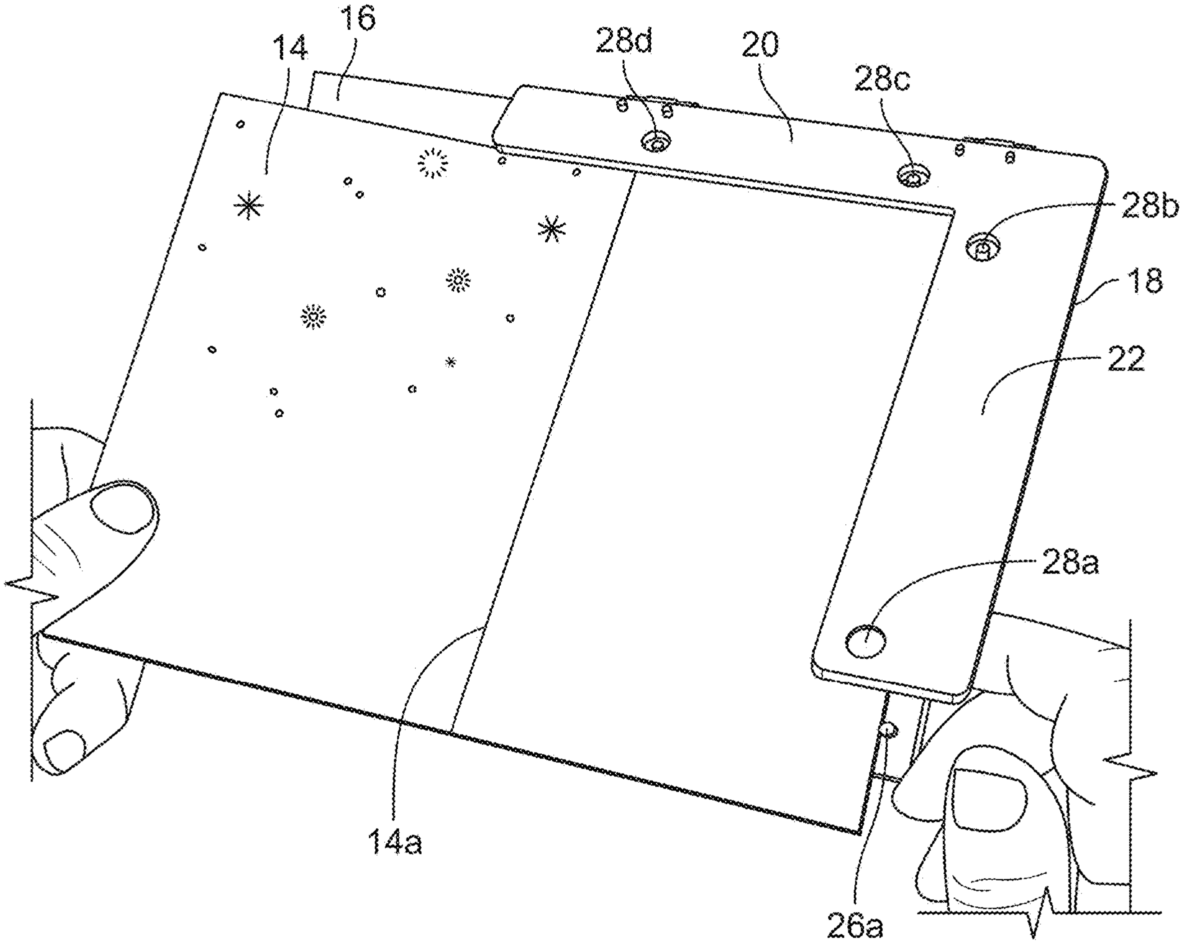
FIG. 2 is a perspective view of the jig of FIG. 1, showing the guide in an open position to enable placement of the greeting card on the support surface.

As shown in FIG. 2, the right side of second guide segment 22 extends slightly past support surface 16, which provides finger access to enable a user to lift second guide segment 22 and move guide 18 from the closed position to the open position. When guide 18 is in the open position, a user may place greeting card 14 in an unfolded state at a predetermined location on support surface 16.

As best shown in FIG. 1, jig 10 includes four register pins 26*a*, 26*b*, 26*c* and 26*d* (register pin 26*a* can be seen in FIG. 2) each of which is fixedly attached to support surface 16 and extends upwardly therefrom. Register pins 26*a* and 26*b* are spaced apart on the right side of support surface 16, and register pins 26*c* and 26*d* are spaced apart on the top side of support surface 16. When greeting card 14 is placed on support surface 16, as shown in FIG. 2, a user is able to register greeting card 14 against register pins 26*a*, 26*b*, 26*c* and 26*d* such that register pins 26*a* and 26*b* engage a right edge of the opened greeting card and register pins 26*c* and 26*d* engage a top edge of the opened greeting card. Thus, greeting card 14 is placed at the predetermined location on support surface 16 when registered against register pins 26*a*, 26*b*, 26*c* and 26*d*.

As best shown in FIG. 2, second guide segment 22 includes two openings 28*a* and 28*b* formed therein that are positioned to correspond with register pins 26*a* and 26*b*, respectively. Similarly, first guide segment 20 includes two openings 28*c* and 28*d* formed therein that are positioned to correspond with register pins 26*c* and 26*d*, respectively. As shown in FIG. 3, register pins 26*a*, 26*b*, 26*c* and 26*d* extend through openings 28*a*, 28*b*, 28*c* and 28*d*, respectively, when guide 18 is moved from the open position to the closed position.

It should be understood that the invention is not limited to the use of post-style register pins 26*a*, 26*b*, 26*c* and 26*d* and that other mechanisms may be used to register greeting card 14 on support surface 16. For example, it is possible to use register clips (similar to those used on platen style presses) that enable greeting card 14 to slide under each clip for secure and precise placement. Of course, other registration means will be apparent to one skilled in the art.

As shown in FIG. 3, when guide 18 is in the closed position, first and second guide segments 20 and 22 are in flush direct contact with the upper surface of the right inside panel of greeting card 14—regardless of the stock weight or caliper thickness of greeting card 14. Also, first and second guide segments 20 and 22 are positioned to partially frame the right inside panel of greeting card 14. Specifically, first guide segment 20 overlaps a portion of the card that extends along the top edge of the right inside panel and second guide segment 22 overlaps a portion of the card that extends along the right edge of the right inside panel. It will be seen that first and second guide segments 20 and 22 define the position of insert sheet 12 when placed on the right inside panel of greeting card 14.

It can be appreciated that the configuration of guide 18 allows for the insertion of greeting cards having varying lengths, widths, and thicknesses—i.e., the bottom and left edges of the greeting card are not constrained so as to enable the use of greeting cards having different lengths and widths, and the moveable/liftable guide 18 enables the use of greeting cards having different thicknesses.

Referring to FIG. 4, first guide segment 20 provides an indication of an area for application of an adhesive to the right inside panel of greeting card 14 when guide 18 is in the closed position. It will be seen that the applied adhesive enables a user to secure insert sheet 12 to the right inside panel of greeting card 14. In this embodiment, a strip of adhesive is applied below and generally parallel to the bottom edge of first guide segment 20, wherein register pin 26*d* is used as a starting point and the left edge of second guide segment 22 is used as the ending point for the adhesive application. It can be appreciated that guide 18 protects the card border from receiving adhesive so as to prevent the first and second card pages from being adhered together when greeting card 14 is closed. Of course, in other embodiments, the jig may include other starting and ending points to guide the adhesive application.

In some embodiments, different reference marks may be provided on first guide segment 20 to enable the application of adhesive to greeting cards having varying widths. In this case, each available greeting card size is associated with a reference mark to be used as the starting point for the adhesive application and/or a reference mark to be used as the ending point for the adhesive application. The reference marks may be punched, notched, or applied via a laser on first guide segment 20, and may be color-coded for easy identification. Alternatively, first guide segment 20 may have a moveable marker that can be adjusted for various card sizes.

In this embodiment, a user utilizes a glue stick 30 to apply a strip of glue to the right inside panel of greeting card 14. Advantageously, the use of glue stick 30 enables a user to adjust the placement of insert sheet 12 on the right inside panel of greeting card 14 without tearing, wrinkling or otherwise damaging insert sheet 12 or greeting card 14. Of course, other types of adhesives may also be used, such as a spray adhesive or double-sided tape placed on either the right inside panel of greeting card 14 or the back of insert sheet 12.

It should also be understood that the adhesive may be applied to other locations on the right inside panel of greeting card 14. In other words, while a strip of adhesive is applied to the greeting card 14 at a position below and generally parallel to the bottom edge of first guide segment 20 in the illustrated embodiment, the adhesive may alternatively be applied to other locations on the right inside panel—provided that the adhesive positioning is sufficient to secure the insert sheet 12 to the greeting card 14.

As shown in FIG. 5, guide 18 serves as a template to enable a user to place insert sheet 12 at a designated location on the right inside panel of greeting card 14. Guide 18 is configured such that insert sheet 12 may be placed at the designated location by aligning the top edge of insert sheet 12 with the bottom edge of first guide segment 20 and aligning the right edge of insert sheet 12 with the left edge of second guide segment 22. Because guide 18 is in flush direct contact with the upper surface of the card page, insert sheet 12 will not pass between guide 18 and greeting card 14 to thereby enable proper placement of insert sheet 12. A personalized message or other content may be printed on insert sheet 12 prior to placement on greeting card 14. It can be appreciated that the size of insert sheet 12 will vary depending on the size of greeting card 14. The final product comprising insert sheet 12 secured to the right inside panel of greeting card 14 is shown in FIG. 7.

It should be understood that the present invention is not limited to use with a four-panel greeting card (such as greeting card 14) and may be used with greeting cards having a different number of card panels and/or other card configurations. In those embodiments, the insert sheet may be applied to other card panels as desired for a particular implementation. For example, if a two-panel postcard-type greeting card is used, the insert sheet may be applied to either panel of the greeting card. As another example, if a folded greeting card having six panels is used, the insert sheet may be applied to any of the card panels (typically one of the panels on the inside of the greeting card when in a folded state).

It should be understood that jig 10 shown in FIGS. 1-5 is one embodiment of the present invention and that other jig configurations may be used. For example, FIG. 6 shows an alternative embodiment of a jig in which a tab 32 is added to the left side of first guide segment 20 to provide a visual and physical indication of the starting point for application of the adhesive (the jig configuration is otherwise the same as that of jig 10). Of course, this embodiment would not be ideal when used with greeting cards of varying widths because tab 32 would shorten the required glue line for larger cards.

Other jig configurations are also possible within the scope of the present invention. For example, jig 10 could be modified such that the hinges are provided on second guide segment 22 rather than first guide segment 20. Also, the jig may be provided in a fixed configuration in which the guide is not moveable with respect to the support surface. In this case, the greeting card may be inserted in a gap between the guide and support surface, and a rubber or comb brush material may be placed on the bottom surface of the guide to enable registration of the greeting card. Of course, this configuration would not be ideal when used with greeting cards of varying thicknesses—e.g., a greeting card with a lower caliper thickness may enable the insert sheet to slip under the guide.

The jig of the present invention may be used in a variety of implementations. For example, the jig may be incorporated into a packing station at a fulfillment center. In this case, the greeting card with the attached insert sheet may optionally be placed in an envelope and enclosed in a box or other packaging used to deliver one or more products to a gift recipient. The card with the attached insert sheet may also be delivered to a gift recipient as a standalone product—either with or without a gift card, etc. Of course, other implementations will be apparent to one skilled in the art.

General Information

The description set forth above provides several exemplary embodiments of the inventive subject matter. Although each exemplary embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The use of any and all examples or exemplary language (e.g., "such as" or "for example") provided with respect to certain embodiments is intended merely to better describe the invention and does not pose a limitation on the scope of the invention. No language in the description should be construed as indicating any non-claimed element essential to the practice of the invention.

The use of the terms "comprises," "comprising," or any other variation thereof, are intended to cover a non-exclusive inclusion, such that a system or method that comprises a list of elements does not include only those elements, but may include other elements not expressly listed or inherent to such system or method.

Finally, while the present invention has been described and illustrated hereinabove with reference to various exemplary embodiments, it should be understood that various modifications could be made to these embodiments without departing from the scope of the invention. Therefore, the present invention is not to be limited to the specific structural configurations or methodologies of the exemplary embodiments, except insofar as such limitations are included in the following claims.

What is claimed and desired to be secured by Letters Patent is as follows:

1. A jig for placement of an insert sheet on a greeting card, comprising:

a support surface configured to support the greeting card;

a guide configured for movement between an open position and a closed position, wherein the guide enables placement of the greeting card at a predetermined location on the support surface when the guide is in the open position, and wherein the guide provides a template for placement of the insert sheet at a designated location on the greeting card when the guide is in the closed position; and a registration mechanism coupled to the support surface, wherein the greeting card is registered with the registration mechanism when placed at the predetermined location on the support surface.

2. The jig of claim 1, wherein the guide comprises a first guide segment disposed generally perpendicular to a second guide segment.

3. The jig of claim 2, wherein the first and second guide segments are positioned to partially frame a card panel of the greeting card when the guide is in the closed position.

4. The jig of claim 3, wherein the first guide segment overlaps a first card portion of the card panel and the second guide segment overlaps a second card portion of the card panel when the guide is in the closed position.

5. The jig of claim 4, wherein the first card portion extends along a top edge of the card panel and the second card portion extends along a right edge of the card panel.

6. The jig of claim 2, wherein the first guide segment provides an indication of an area for application of an adhesive to the greeting card when the guide is in the closed position, wherein the insert sheet is secured to the greeting card at the designated location via the adhesive.

7. The jig of claim 2, wherein the first and second guide segments are configured such that, when the insert sheet is placed at the designated location on the greeting card, a top edge of the insert sheet aligns with a bottom edge of the first guide segment and a right edge of the insert sheet aligns with a left edge of the second guide segment.

8. The jig of claim 1, wherein the registration mechanism comprises a plurality of register pins each of which is fixedly attached to the support surface and extends upwardly therefrom, wherein the greeting card is registered against the register pins when placed at the predetermined location on the support surface.

9. The jig of claim 8, wherein each of the register pins is positioned to engage one of a plurality of edges of a card panel of the greeting card when placed at the predetermined location on the support surface.

10. The jig of claim 9, wherein one or more of the register pins is positioned to engage a top edge of the card panel and one or more of the register pins is positioned to engage a right edge of the card panel.

11. The jig of claim 8, wherein the guide includes a plurality of openings each of which is positioned to correspond with one of the register pins, wherein each of the register pins extends through the corresponding one of the openings when the guide is in the closed position.

12. The jig of claim 1, wherein the guide is pivotably mounted on the support surface to enable pivotal movement of the guide between the open and closed positions.

13. A method of using a jig to place an insert sheet on a greeting card, wherein the jig comprises a support surface and a guide, the method comprising:

moving the guide to an open position;

placing the greeting card at a predetermined location on the support surface;

moving the guide to a closed position; and using the guide as a template to place the insert sheet at a designated location on the greeting card.

14. The method of claim 13, wherein the guide comprises a first guide segment disposed generally perpendicular to a second guide segment.

15. The method of claim 14, wherein the first and second guide segments are positioned to partially frame a card panel of the greeting card when the guide is in the closed position.

16. The method of claim 15, wherein the first guide segment overlaps a first card portion of the card panel and the second guide segment overlaps a second card portion of the card panel when the guide is in the closed position.

17. The method of claim 16, wherein the first card portion extends along a top edge of the card panel and the second card portion extends along a right edge of the card panel.

18. The method of claim 14, wherein the method further comprises:

using the first guide segment as an indicator to apply an adhesive to an area of the greeting card when the guide is in the closed position; and securing the insert sheet to the greeting card at the designated location via the adhesive.

19. The method of claim 14, wherein using the guide as a template to secure the insert sheet to the greeting card at the designated location comprises:

aligning a top edge of the insert sheet with a bottom edge of the first guide segment; and aligning a right edge of the insert sheet with a left edge of the second guide segment.

20. The method of claim 13, wherein the jig includes a plurality of register pins each of which is fixedly attached to the support surface and extends upwardly therefrom, wherein each of the register pins is positioned to engage one of a plurality of edges of a card panel of the greeting card when placed at the predetermined location on the support surface.

21. The method of claim 20, wherein the greeting card comprises a card panel having a plurality of edges each of which engages one of the register pins when placed at the predetermined location on the support surface.

22. The method of claim 21, wherein the greeting card is placed on the support surface such that a top edge of the card panel engages one or more of the register pins and a right edge of the card panel engages one or more of the register pins.

23. The method of claim 20, wherein the guide includes a plurality of openings each of which is positioned to correspond with one of the register pins, wherein each of the register pins extends through the corresponding one of the openings when the guide is in the closed position.

24. The method of claim 13, wherein the guide is pivotably mounted on the support surface to enable pivotal movement of the guide between the open and closed positions.

25. A jig for placement of an insert sheet on a greeting card, comprising:

a support surface configured to support the greeting card; and a guide configured for movement between an open position and a closed position, wherein the guide is L-shaped and comprises a first guide segment extending laterally along a top edge of the support surface and a second guide segment extending longitudinally along the right edge of the support surface, wherein the guide enables placement of the greeting card at a predetermined location on the support surface when the guide is in the open position, wherein the guide provides a template for placement of the insert sheet at a designated location on the greeting card when the guide is in the closed position, wherein the first and second guide segments are positioned to partially frame a card panel of the greeting card when the guide is in the closed position, wherein the first guide segment overlaps a first card portion of the card panel extending along a top edge of the card panel when the guide is in the closed position, and the second guide segment overlaps a second card portion of the card panel extending along a first side edge of the card panel when the guide is in the closed position, and wherein the guide is configured to not constrain a bottom edge and a second side edge of the greeting card when the guide is in the closed position.

* * * * *